United States Patent [19]

Hunter

[11] 4,277,091
[45] Jul. 7, 1981

[54] COUPLING FOR LINED PIPE

[76] Inventor: John J. Hunter, 1410 Willow Pond, Abilene, Tex. 79602

[21] Appl. No.: 47,151

[22] Filed: Jun. 11, 1979

Related U.S. Application Data

[63] Continuation-in-part of Ser. No. 31,533, Apr. 19, 1979, abandoned.

[51] Int. Cl.³ .................... F16L 9/14; F16L 13/14
[52] U.S. Cl. .................... 285/55; 29/458; 29/525; 285/369; 285/382.2
[58] Field of Search ........ 285/55, 382.2, DIG. 16, 285/54, 53, 369, 15; 29/525, 458

[56] References Cited

U.S. PATENT DOCUMENTS

| 1,188,485 | 6/1916 | Pruyn | 285/397 X |
|---|---|---|---|
| 2,233,734 | 3/1941 | Ely et al. | 285/55 |
| 2,241,517 | 5/1941 | Moise | 285/369 X |
| 3,149,861 | 9/1964 | Larsson | 285/369 X |
| 3,253,841 | 5/1966 | Ahmad | 285/55 |
| 3,266,821 | 8/1966 | Stafford | 285/40 |
| 3,298,716 | 1/1967 | Taylor et al. | 285/369 X |
| 3,343,252 | 9/1967 | Reesor | 285/292 X |
| 3,466,738 | 9/1969 | Mount | 29/525 |
| 3,474,834 | 10/1969 | Carey | 285/55X |
| 3,516,690 | 6/1970 | Kreig | 285/55 |
| 3,596,931 | 8/1971 | Mishler | 285/369 X |
| 3,893,718 | 7/1975 | Powell | 285/53 |
| 4,064,619 | 12/1977 | Echols et al. | 285/55 X |

FOREIGN PATENT DOCUMENTS

| 643721 | 4/1937 | Fed. Rep. of Germany | 285/55 |
|---|---|---|---|
| 828783 | 1/1952 | Fed. Rep. of Germany | 285/55 |
| 1817753 | 11/1970 | Fed. Rep. of Germany | 285/382.2 |
| 318957 | 3/1957 | Switzerland | 285/55 |
| 381932 | 11/1964 | Switzerland | 285/55 |
| 19043 | of 1889 | United Kingdom | 29/525 |
| 367419 | 2/1932 | United Kingdom | 29/525 |
| 1038134 | 8/1966 | United Kingdom | 285/55 |
| 1245043 | 9/1971 | United Kingdom | 285/382.2 |

*Primary Examiner*—Thomas F. Callaghan
*Attorney, Agent, or Firm*—Kanz & Timmons

[57] ABSTRACT

Disclosed are coupling joints for interconnecting the ends of metal conduit sections having plastic liners to form a continuously lined conduit and methods for making such joints. The opposed open ends of lined pipe are fitted with flanged end face collars which cover the end faces of the pipe and the open ends are then joined in an abutting relationship within a coupling sleeve by interference fit coupling. The coupling sleeve carries an internal sealing band which mates with the outer edges of the opposed collars to fully seal the joint and the ends of the coupling sleeve are radially crimped into a corresponding groove in the pipe to mechanically interlock the joint. Fully lined couplings are also formed by fitting an end face collar in the pin end of one lined conduit and interference fitting the pin end into an unlined bell on a lined conduit.

18 Claims, 8 Drawing Figures

COUPLING FOR LINED PIPE

This is a continuation-in-part of application Ser. No. 031,533 filed Apr. 19, 1979 entitled "Coupling For Lined Pipe" and now abandoned.

This invention relates to methods for joining lengths of non-threaded metal pipe. More particularly, it relates to methods and apparatus for interference fit joining and interlocking lengths of lined conduit to form a continuously lined conduit and to the joint or coupling formed such methods.

Various methods have been used for joining lengths of pipe to form a continuous conduit. Perhaps the most common pipe joining method involves the joining of an externally threaded pin end of one pipe section with an internally threaded box end of another pipe section. The interconnection is generally called a joint and in the case of threaded ends is called a threaded joint.

While satisfactory for many purposes, threaded pipe joints are relatively expensive to prepare and considerable time is required to form a junction therebetween. For example, at least one of the lengths of pipe must be rotated to join two threaded pipe lengths, thereby rendering it difficult if not impossible to join two relatively long lengths of pipe with conventional threaded ends.

Other coupling methods, such as welding, are commonly used to join pipe. However, in many applications it is necessary to provide the entire inner surface of a conduit with a protective liner. The internal surfaces are best protected with a liner of polyvinyl chloride bonded to the internal surface of the pipe as described in U.S. Pat. No. 3,758,361 to John J. Hunter or other lining materials such as polyester resins or the like. When the internal surface of the conduit is protected by such liners (referred to herein as "plastic" liners), means must be provided for joining the liners at the junction of two pipe lengths so that the liner is continuous and the entire internal surface of the conduit formed is continuously lined. Because of the heat required in welding pipe ends together, welding cannot be commonly used to join lengths of lined pipe since the plastic liner will melt and separate from the pipe walls when the pipe is welded.

For forming conduits in which the pressure of the fluid to be conducted through the pipe is relatively low, various types of non-threaded joints have been devised. Non-threaded joints are typically formed by enlarging the internal diameter of one end of the pipe section to a diameter slightly less than the external diameter of the pipe. The enlarged end is commonly referred to as a bell and the end of the adjoining pipe which fits within the bell is commonly referred to as the pin end or spigot. Conventionally, the bell is formed by forcing a mandrel of desired shape into one end of the pipe to form a bell of enlarged dimensions with a flared end so that the pin end may be inserted into the flared portion and forced into the remaining portion of the bell. Such joints are referred to as interference fit joints and are commonly used in applications wherein the pressure of the fluid passing through the conduit is relatively low, such as, for example, in automobile exhaust pipes and the like. Since the internal diameter of the bell is less than the external diameter of the pin, the bell must be slightly expanded radially as the pin is axially inserted therein. The difference in diameters is conventionally known as the interference and the friction between the walls interference fitted together forms the joint or coupling force.

One of the main advantages of interference fit joints is that they may be formed relatively quickly and inexpensively and neither pipe section need be rotated to form the junction. Furthermore, since excessive heat is not required to form an interference fit joint, plastic lined pipe sections may be formed with appropriately designed ends on the plastic liner which mate or overlap in some manner to form a fully lined conduit on assembly. Among the disadvantages of conventional interference fit joints is that the joint is usually incapable of withstanding high pressures and will either leak or separate if the joint is subjected to high internal pressures.

Various methods for joining ends of lined pipe have been devised whereby a fully lined conduit is formed. However, in most cases the ends of the lined pipe are specially prepared with lining extending out of one end of the pipe in some particular form so that a fully lined conduit is formed when the specially prepared ends are joined. Where the liner is a tubular liner inserted in the pipe and bonded thereto, provisions may be made to appropriately extend the liner from the end of the pipe so that overlapping ends of the liner form a fully lined conduit when the pipe sections are joined by interference fit methods. However, where the liner is formed in place, such as by spraying a coating onto the internal surface of the pipe, it has been heretofore impossible to form a fully lined conduit by interference fit coupling. Furthermore, it is frequently necessary to remove a portion of a conduit formed from lined sections to replace damaged or faulty sections or to interconnect the conduit with other conduits through a T or the like. When such repairs or alterations are made, a pipe section must be cut and the open end thereof joined with another pipe section or other conduit means.

It will be observed, however, that when a plastic lined pipe has been cut, the end facing of the metal pipe is exposed. Accordingly, unless special precautions are taken to protect the exposed end facing of the pipe, the exposed end will be in fluid communication with the interior of the conduit when the conduit is rejoined.

It will be appreciated, of course, that a conventional flange cannot be welded directly to thin-walled pipe which has a plastic liner since the heat generated by the welding process will ordinarily destroy the liner. Furthermore, the pipe is frequently of such thin-walled construction that it cannot be conveniently threaded to attach a flange or nipple. Accordingly, alternative joining means is required.

Conventional interference fit joints cannot be formed since the conduit is lined. Interference fit joints may be formed in accordance with the invention, however, with either thick-walled or thin-walled lined pipe by using a coupling sleeve to join the ends of the lined pipe and special means for protecting the end faces of the metal pipe within the sleeve.

In accordance with the invention, methods and apparatus are provided for joining the ends of two lined metal pipe sections in which the ends of the liner and the end faces of the metal pipe are substantially coterminous to form a continuous fully lined conduit. The end faces of the metal pipe sections are protected by a plastic collar which is inserted in the open end of the lined pipe and has a flange extending radially to cover the end of the metal pipe. The flanged collars are forced together inside a coupling sleeve which joins the two pipe sections together by an interference fit coupling. A band of plastic liner is carried in an annular recess in the coupling sleeve to mate with the radial edges of the flanged plastic collars so that the conduit is fully lined. The ends of the sleeve are then depressed into the pipe to form a mechanical interlock. Accordingly, a connection is formed wherein the ends of the pipe section are joined to provide a fully lined conduit. Furthermore, the joint is formed conveniently and rapidly without application of sufficient heat to damage the lined pipe and the interconnection is sufficiently mechanically interlocked to withstand any internal pressure which the remainder of the conduit will withstand.

The interconnection method of the invention may be conveniently used in the field to make repairs or alterations in existing lined conduits since rotation of the pipe is not required to form the joint. In an alternative embodiment of the invention, the plastic collar may be inserted into the pin end of a lined pipe and used to complete a fully lined junction with the bell end of another appropriately coated pipe section. Accordingly, the invention also provides a means for coupling spray-coated lined pipe by interference fit methods to form a fully lined junction.

Other features and advantages will become more readily understood from the following detailed description taken in connection with the appended claims and attached drawings in which:

Various methods are known in the art for forming continuously lined conduit by joining the ends of lined pipe sections. Conventionally, metal pipe sections having a continuous tubular plastic liner such as polyvinyl chloride or other plastic are formed so that the plastic liners extend from the end of the section and overlap at the joint or are formed in some other manner so that the ends of the plastic liners are joined to form a continuously lined conduit.

When a section of such lined conduit is removed, the removal is usually accomplished by merely cutting through the pipe. The pipe may be cut for several reasons, such as to remove a faulty, damaged or leaky section or to install a T or other apparatus. However, when a portion of the conduit is removed, such as by sawing or the like, the pipe and liner are both severed in the same plane leaving an open end. The end face of the pipe is thus exposed and not coated with the liner. In order to rejoin the pipe sections or to join the pipe sections with other conduit, means must be provided to protect the exposed end face of the pipe.

Figure 1:
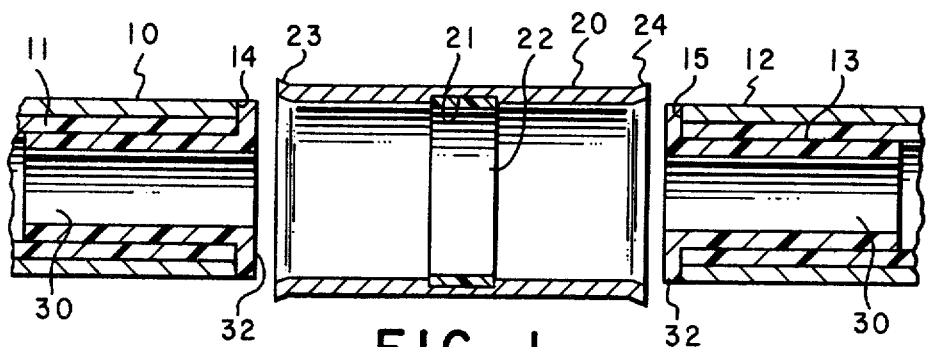
FIG. 1 is a sectional view of the end portions of two lined pipe sections and the coupling sleeve of the invention prior to assembly.
Figure 3:
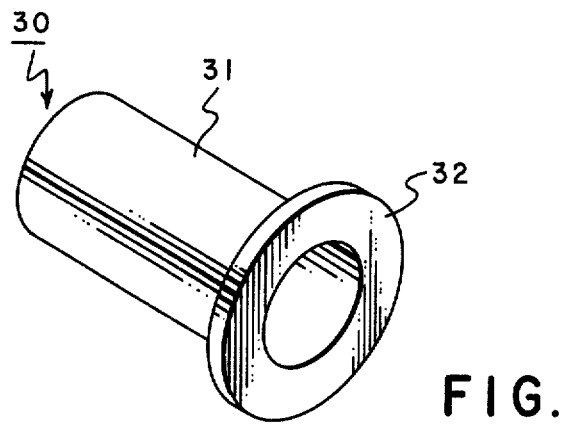
FIG. 3 is a perspective view of one embodiment of the end face collar of the invention.

FIG. 1 illustrates the opposed ends of two pipe sections wherein the pipe liner and metal pipe are coterminous and which are to be joined to form a continuously lined conduit. As illustrated in the drawings, a first pipe section 10 having a plastic liner 11 is to be joined with a second section pipe section 12 having a plastic liner 13. The metal pipes 10 and 12 both have exposed end faces 14 and 15 lying in the planes of the end faces of liners 11 and 13, respectively. In order to protect the end faces 14 and 15 and join the ends of the pipe sections 10 and 12 to form a continuously lined conduit, an end face collar 30 is positioned within the open end of pipe 10. As illustrated in FIG. 3, the end face collar 30 comprises an open-ended cylindrical body 31, the outer dimensions of which substantially conform to the internal dimensions of liner 11 in the pipe. The end face collar 30 includes a radially extending flange 32 which radiates outwardly from the end of the body 31 to mate with the exposed end face 14 of the pipe 10 as illustrated in FIG. 1. Preferably the end face collar 30 is of the same material as liner 11. Therefore, end face collar 30 may be bonded to the liner 11 with a solvent such as methyl ethyl ketone or any suitable conventional epoxy cement or the like compatible with the materials used. Flange 32 radiates outwardly at least as far is required to completely cover the exposed end face of the pipe and may have an external diameter as much as 0.015 inch greater than the external diameter of the pipe.

An identical collar 30 is similarly positioned within the open end of the second pipe section 12.

The ends of the pipe sections 10 and 12 are arranged coaxial with a coupling sleeve 20. Coupling sleeve 20 may be a relatively short section of metal pipe having an internal diameter slightly less the external diameter of the ends of pipe sections 10 and 12. In the preferred embodiment, the internal diameter of coupling sleeve 20 is approximately 0.060 inch less than the external diameter of the ends of the pipe sections 10 and 12. The difference in internal and external diameters is known as the interference and, as is known in the art, may vary depending on the size and wall thickness of the pipe, the material of the pipe, the axial length of the interference and other factors. The open ends 23 and 24 of the coupling sleeve are preferably flared outwardly as indicated in FIG. 1 to aid in the insertion of the open ends of the pipe therein.

In the preferred embodiment, coupling sleeve 20 is provided with an approximately centrally located annular recess or groove 21 which carries a sealing band 22. Sealing band 22 is preferrably of the same material as liner 11 and end face collar 30. The sealing band 22 is preferrably bonded or otherwise secured within the recess 21 with a suitable epoxy bonder or the like. The internal diameter of sealing band 22 is at least as small as the internal diameter of the remainder of coupling sleeve 20 and may have an internal diameter as much as about 0.005 to about 0.015 inch less than the internal diameter of the coupling sleeve 20.

The coupling joint of the invention is formed by either simultaneously or individually forcing the open ends of pipes 10 and 12 fitted with end face collars 30 as described hereinabove into the opposite open ends of the coupling sleeve 20.

In order to assure a uniform and stable joint, it is preferred that the ends of pipe sections 10 and 12 be cleaned and sized prior to assembly. It is well known that outer diameters of pipe may vary slightly from manufacturer to manufacturer and frequently pipe is not completely circular in cross-section. This may be particularly true where the conduit has been previously used.

Furthermore, buried or exposed conduit may have corrosion on the exterior surface. Therefore, in order to prepare the ends for interference fit joining, the ends may be cleaned to remove scale, corrosion and the like by conventional means and sized by passing a circular sizing collar thereover. Sizing the ends to the desired external diameter prior to assembly assures that the desired interference is achieved and avoids galling, etc., which would be detrimental to forming a satisfactory interference fit joint.

If desired, a suitable solvent or bonding agent may be applied to the flanges 32 immediately prior to assembly of the coupling to provide a sealing bond between the opposed faces of the flanges 32 and between the edges of the flanges and the sealing band 22.

In forming interference fit joints a lubricating agent is sometimes applied to the pin end of the pipe to aid in inserting the pin end within the bell. When a conventional lubricating agent is used, care must be taken to avoid mixing the lubricating agent with conventional plastic bonding agents such as PVC cement and the like since the lubricating agent will interfere with a formation of a bond between the plastic parts.

In the preferred embodiment of the present invention an epoxy resin is used as both a lubricating agent and to aid in forming metal-to-metal bond between the ends of the pipe and the coupling sleeve 20. Any suitable conventional bonding agent may be used. A two-part epoxy agent for forming metal-to-metal seals has been found particular suitable. The preferred epoxy resin is a metal bonding agent sold under the name Steel Seam by Cooks Paint & Varnish Company of Kansas City, Mo. This bonding agent is a two-part epoxy comprising a curing agent (sold under the trade designation 920L927) which is mixed with a base (sold under the trade designation 920W979). The curing agent and base are mixed immediately prior to use and applied to the external surface of the pipe ends immediately prior to insertion of the pipe ends in the coupling sleeve 20. Care should be taken to avoid mixing the metal-to-metal bonding agent with any PVC cement or solvent used to join the plastic parts. The particular two-part epoxy described hereinabove, however, may be used for both bonding PVC parts as well as the metal joint. In this case no PVC cement used. Instead, the two-part epoxy is applied to both the plastic parts and ends of the pipe before insertion of the pipe ends into the coupling sleeve. While the plastic-to-plastic seal achieved is not of the quality achieved with PVC cement, it has been found suitable in most applications. Therefore, a single application of this epoxy may serve as lubricating agent, the metal-to-metal bonding agent and the plastic-to-plastic bonding agent to eliminate problems of contamination.

Various commercially available apparatus may be used for forcing the pipe ends into the coupling sleeve. For example, a conventional pipe press or the like may be used. In the preferred embodiment, the coupling sleeve is held stationary and the end of one pipe telescopically forced thereinto until the leading edge of the flange 32 is approximately centrally located within the sealing band 22. The other pipe end is then forced into the opposite end of the coupling sleeve 20 until the opposing flanges 32 meet in an abutting relationship within the sealing band 22.

Figure 2:
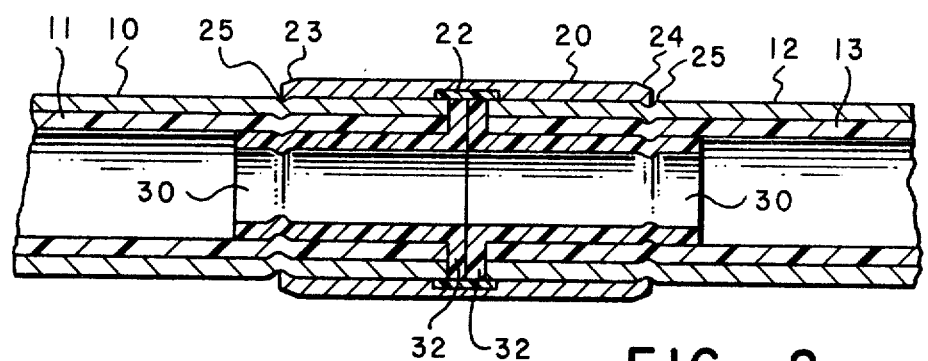
FIG. 2 is a sectional view of a coupling joint formed in accordance with the invention.

The completed joint is illustrated in FIG. 2. It will be observed that the opposed faces of the flanges 32 are mated in a sealing relationship and their outer edges mate with the sealing band 22 to form a sealed connection. The flanges 32 are held together by the end faces 14 and 15 of the pipe ends which are fully encased within the plastic material. Thus a fully plastic lined conduit is formed. However, structural rigidity is maintained by the interference fit between the pipe ends and coupling sleeve 20. In order to lock the ends of the pipe in a fixed relationship, the flared ends 23 and 24 of coupling sleeve 20 are then radially compressed into the pipe sections 10 and 11, respectively.

Radial compression of the ends of the sleeve 20 to form a crimped interlock may be performed by various methods. Any apparatus which deforms a portion of the sleeve into a corresponding groove in the pipe formed by compressing the end of the sleeve may be used. In the preferred embodiment, uniform radial compression is accomplished by partially forcing a crimping collar axially over the end of the sleeve 20 after the interference fit joint has been formed. The crimping collar has an internal diameter which is divergent from a diameter of a slightly more than the external diameter of the pipe to an internal diameter greater than the external diameter of the flared portion of the sleeve. The flared crimping collar is placed over the pipe with its internal diameter expanding in the direction of the sleeve. After the interference fit joint has been formed, the crimping collar is moved axially over the pipe to engage the flared end of the sleeve. Since the crimping collar is internally flared and completely surrounds the pipe, the end of the sleeve is uniformly radially compressed and forced into the pipe to form a groove 25. The end of the sleeve 20 is thus permanently deformed and fitted into the groove 25 to form a interlocking joint as shown in FIG. 2.

While it is preferred is that the crimped interlock be formed by uniform radial compression for a full 360° around the end of the sleeve, it will be recognized that a full 360° crimp is not necessarily required. Any portion of the sleeve may be crimped to interlock the pipe sections without departing from the principles of the invention. When less than a full 360° crimp is used, however, the degree of mechanical interlock will be proportionately reduced.

While the invention has been particularly described with reference to crimping the mouth end of the sleeve by forcing a crimping ring thereover, it will be readily appreciated that other means may be used for applying radial compression to the mouth or other portion of the sleeve. For example, a circumferentially rotating inwardly compressing roller may be used to roll the mouth of the sleeve into the pipe to accomplish similar results. Rolling the mouth of the sleeve to form the crimp does not apply uniform radial compression to the mouth and thus may not form a uniformly crimped joint. However, use of a circumferential radially compressing roller permits deformation of the sleeve 20 at locations other than the end thereof. For example, a circumferential radial roller may be used to form one or more grooves or sections of grooves at various locations along the length of the sleeve to form similar mechanical interlocks.

The interconnection method and apparatus described hereinabove may be used equally well with conduit in which the liner is a tubular liner bonded to the internal surface of the pipe and with spray-coated liners formed in place by spraying or otherwise applying a fluid liner to the interior of the pipe to form a liner in place. However, the formed in place liners are usually thinner than bonded tubular liners and sometimes rupture when the groove 25 is formed by compression of the open end of the sleeve. Obviously, if the liner is ruptured, cracked or dislocated by the crimping operation, a fully lined conduit will not be formed. In accordance with the preferred practice of the invention, the tubular body 31 of the end face collar 30 must be of sufficient axial length to extend past the groove 25 formed in the crimping operation. If the tubular body is bonded to the liner 11 and extends past the groove 25, the body 31 will merely be slightly deformed at the groove but will not separate from the liner 11, thus a fully lined conduit will be maintained.

Figure 4A:
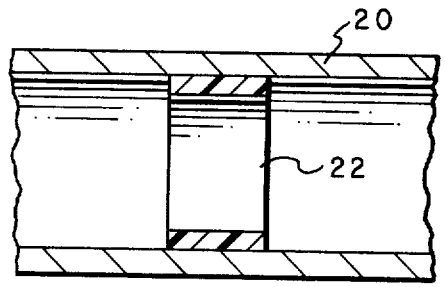
FIG. 4A is a sectional view of one embodiment of the coupling sleeve of the invention before reduction to include the sealing band.
Figure 4B:
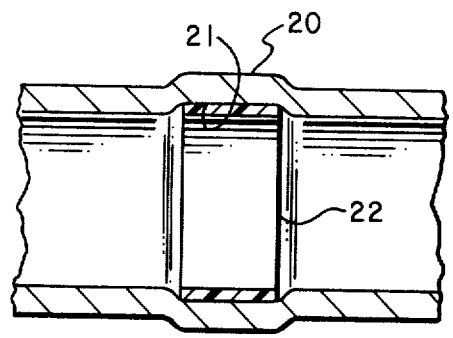
FIG. 4B is a sectional view of the coupling sleeve of FIG. 4A after the sleeve has been reduced in diameter to contain the sealing band.

Since the end faces 14 and 15 of the pipe sections 10 and 12 may not lie exactly 90° from the longitudinal axis of the pipe sections, the opposed flanges 32 may not be fully engaged when the joint is assembled. Accordingly, the sleeve 20 is provided with a sealing band 22 as described hereinabove. Therefore, even though there may be a partial gap between the flanges 32 in the completed joint, any fluid entering the gap can only contact the sealing band 22 so long as the ends of the pipe sections are within the sealing band 22 in the completed joint.

Where relatively thick-walled material is used for the coupling sleeve 20, recess 21 may be formed by cutting a centrally located annular recess in the internal surface of the sleeve. A sealing band 22 of appropriate dimensions and of the desired material may then be affixed within the recess. The sealing band may, of course, be a pre-cut section of material or may be formed in place in the recess 21. Alternatively, where reduction of the wall thickness of the sleeve by grooving is undesireable, a pre-cut sealing band of the required dimensions may be positioned and preferrably bonded within a sleeve 20 as shown in FIG. 4A. Thereafter, the sleeve 20 is reduced in external and internal diameter on both sides of the sealing band 22, thereby containing the sealing band 22 within a groove 21 of the original diameter of the sleeve. Shrinking of the sleeve 20 to the desired dimensions may be accomplished by forcing a sizing ring thereover as described hereinabove with respect to the pipe ends. In any case, the coupling sleeve is formed to contain a sealing band of appropriate size and material approximately centrally located therein having an internal diameter which is less than the external diameter of the pipe to be joined thereby.

The coupling joint described is particularly suitable as a repair joint for coupling the open ends of an installed conduit in the field. While the joint has been described with particular reference to joining two identical open pipe ends to form a continuous conduit, it will be appreciated that the principles thereof are equally applicable to joining one open pipe end with other conduit means where the coupling sleeve is appropriately designed. For example, the coupling sleeve may have different internal diameters on opposite sides of the sealing band if the sealing band is appropriately designed to mate with collars of different external diameters to join pipe sections having different external diameters. Likewise, the coupling sleeve 20 may be an integral part of another conduit section, valve, T or the like wherein the sealing band forms part of or is previously bonded to an internal liner. Likewise, although the invention has been described in connection with use of a PVC liner or the like, it will be readily recognized that the principles of the invention are equally applicable to other types of liners, including lining materials which are formed in place in the conduit by spraying or the like. Furthermore, although the invention as described above is particularly useful in making repair joints in an installed lined conduit, the principles thereof are equally applicable to joining lengths of lined pipe sections to form a lined conduit.

Figure 5:
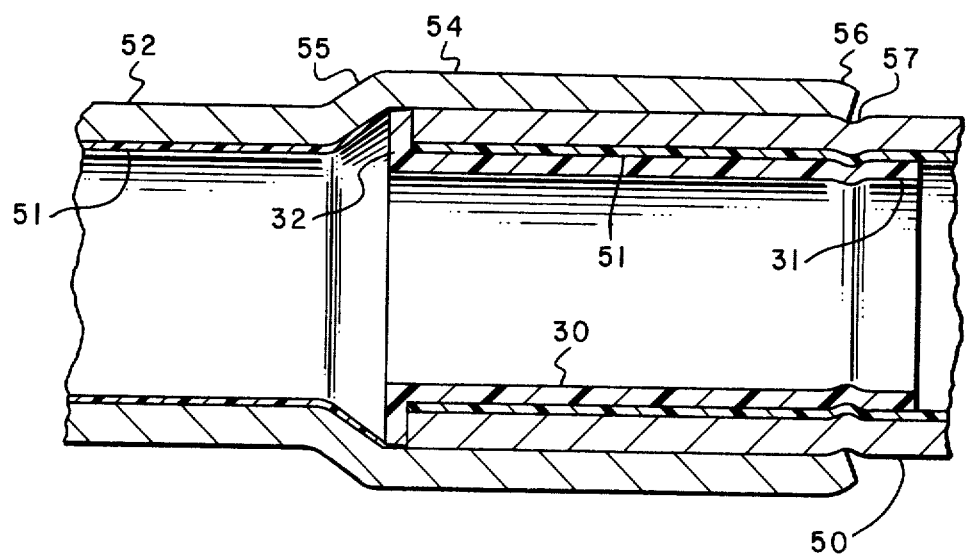
FIG. 5 is a sectional view of a coupling joint formed in accordance with the invention using spray-coated lined pipe joined by interference fit.

An alternative embodiment of the invention is illustrated in FIG. 5 wherein the end face collar 30 is used to coat the end face of a pipe section 50 and form a fully lined junction between two pipe sections joined by interference fit. As indicated above, conventional interference fit couplings cannot be formed to join two lengths of spray coated lined pipe and form a fully lined conduit since the pin end of the pipe is either not coated or the coating thereon is so thin or weak that it is damaged by insertion of the pin into the bell. In accordance with the invention, one end of the pipe section 52 is enlarged to form a bell 54 having an internal diameter slightly less than the pin end of pipe section 50. The bell 50 is thus connected to the pipe 52 by a tapered throat 55. A formed in place coating 51 is formed on the internal surface of the pipe sections 50 and 52 by conventional means such as spraying or the like. The coating on the pin end 50 therefore extends only to the end face of the pipe or may actually cover all or part of the end face. Any such formed in place coating, however, would be too fragile to withstand an interference fit coupling. The coating in the bell end extends at least through the throat 55 but does not extend substantially into the bell 54. Obviously, any coating 51 extending into the bell 54 would be scraped from the metal pipe surface by the pin end when the interference fit joint is formed and may interfere with the formation of an interference fit joint.

To form a fully lined coupling, an end face collar 30 as described herein above may positioned within the pin end of pipe section 50 with the radially extending flange 32 covering the end face of the pin end 50. The tubular body 31 of the end face collar extends into the pipe 50 well past the point where the groove will be formed when the mouth of the bell is deformed and is bonded to liner 11, all as described hereinabove. The pin end 50 is then telescopically forced into the bell 54 until the flange 32 on the end face of the pin mates with and overlaps the leading edge of the coating 51 in the throat 55. As described hereinabove, the pin end of the pipe 50 and the flange 32 are coated with a bonding agent prior to insertion into the bell so that the flange 32 may be bonded directly to the liner 51 in the throat 55. Thus a metal-to-metal interference fit coupling is formed between the pin end 50 and the bell 54 while a bonded plastic-to-plastic seal is formed between the liner 51 in pipe section 52 and the end face collar 30 forming a continuously lined conduit. The mouth 56 of the bell 54 may then be deformed radially inwardly to form and interlock with a groove 57 as described hereinabove to form an interlocked interference fit coupling. Since the tubular body 31 of the end face collar 30 extends past the mouth of the bell 54 and is bonded to the liner 51 in pipe section 50, any rupture or displacement of the liner 51 by formation of the groove is covered by the body 31, thus insuring a fully lined coupling.

Figure 6:
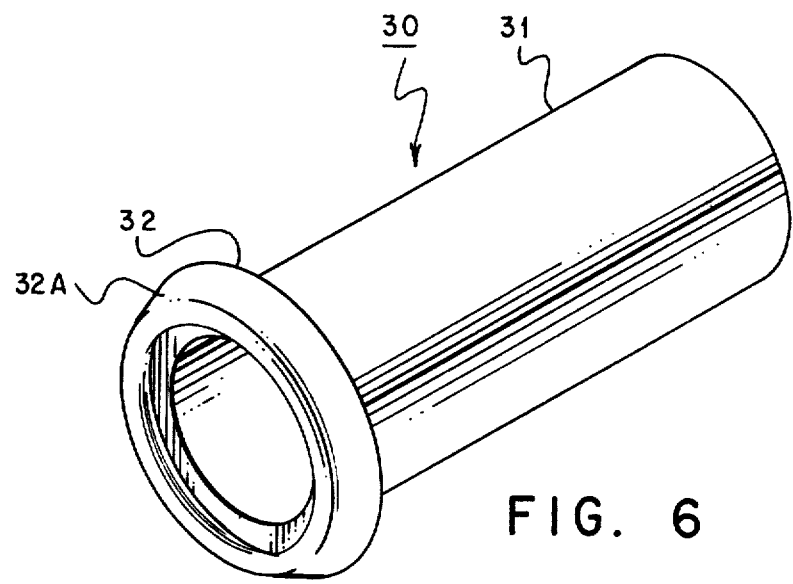
FIG. 6 is a perspective view of an end face collar for use in joining bell and pin ends of lined pipe.
Figure 7:
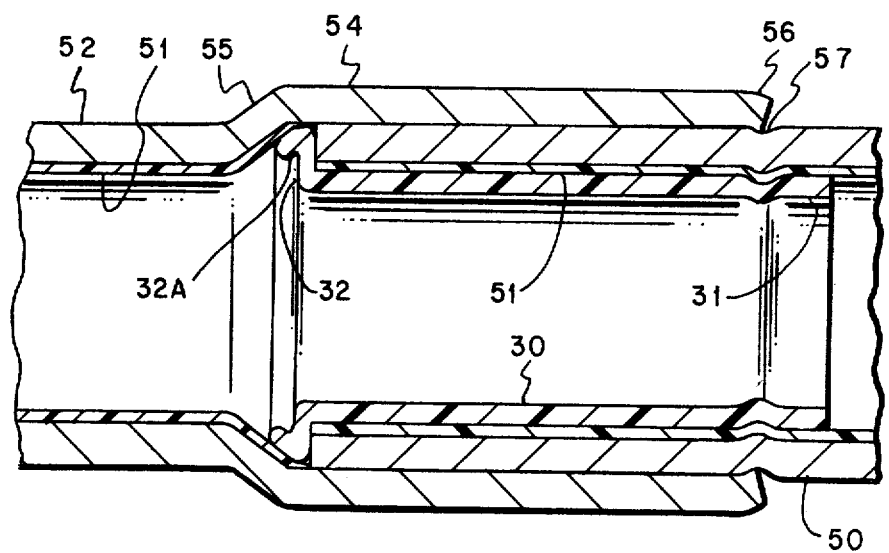
FIG. 7 is a sectional view of a coupling joint formed using the end face collar of FIG. 6.

In order to form an extended overlap of the plastic liner in the joint, the end face collar 30 may be modified as shown in FIGS. 6 and 7. In the modified end face collar of FIGS. 6 and 7 the radially extending flange 32 is extended axially and reverse curled to taper inwardly as shown at 32A. The inwardly tapered extension 32A thus overlaps and mates with the liner 51 in the throat 55 of the bell. The overlapped extension 32A may therefore be bonded directly to the liner 51 in an extended overlap region to form a more effective plastic-to-plastic bond in the joint and form a more effective lined joint. In all other respects, the joint formed as shown in FIG. 7 is the same as the joint formed as shown in FIG. 5.

From the foregoing it will be appreciated that the couplings described hereinabove may be formed using various types of liners for either repair couplings, modification, or for original installation coupling of pipe lined with formed in place liners. Accordingly, it is to be understood that although the invention has been described with particular reference to specific embodiments thereof, the forms of the invention shown and described in detail are to be taken as preferred embodiments thereof, and that various changes and modifications may be resorted to without departing from the spirit and scope of the invention as defined by the appended claims.

What is claimed:

1. A coupling joint interconnecting two lengths of metal pipe comprising:
   (a) first pipe means having a plastic liner on the internal surface thereof, the end face of said plastic liner substantially coterminous with the end face of said pipe means;
   (b) an end face collar comprising a tubular plastic body, the external diameter thereof substantially conforming to the internal diameter of said liner in said first pipe means and having a radially extending flange at one end thereof, said end face collar positioned within the open end of said first pipe with said radially extending flange adjacent the end face of said first pipe means; and
   (c) second pipe means having an internal diameter at the open end thereof less than the external diameter of said first pipe means and having a plastic liner on the internal surface thereof, the end of said plastic liner terminating within said second pipe means at a point removed from the open end thereof, wherein the end of said first pipe means is telescopically interference fit within the open end of said second pipe means and said radially extending flange overlaps said plastic liner in said second pipe means.

2. The coupling joint defined in claim 1 wherein the mouth of said second pipe means is radially inwardly deformed to form a groove in and interlock with said first pipe means.

3. The coupling joint defined in claim 2 wherein said tubular plastic body extends into said first pipe means past said groove.

4. The method of joining the open ends of two sections of metal pipe each having a plastic liner bonded to the internal surface thereof to form a continuously lined conduit comprising the steps of:
   (a) inserting a plastic collar in the open end of one of said pipe sections, said plastic collar comprising a cylindrical body having outer dimensions substantially conforming to the inner dimensions of the liner in the pipe and having a flange extending radially from one end thereof to mate with the end facing of the open end of the pipe; and
   (b) forming an interference fit coupling between said pipe sections by telescopically inserting the open end of said one pipe section into the open end of the other pipe section until said flange mates with the liner in said other pipe section.

5. The method set forth in claim 4 including the step of deforming at least a portion of the mouth of said other pipe section inwardly sufficiently to form a corresponding groove in said one pipe section, thereby mechanically interlocking said pipe sections.

6. The method of joining the open ends of two sections of metal pipe each having plastic liners bonded to the internal surfaces thereof to form a continuously lined conduit comprising the steps of:
   (a) inserting a plastic collar in the open end of each of said pipe sections, said plastic collar comprising a cylindrical body having outer dimensions substantially conforming to the inner dimensions of the liner in the pipe and having a flange extending radially from one end thereof to mate with the end facing of the open end of the pipe; and
   (b) inserting the open ends of said pipe sections in opposite ends of a coupling sleeve having an internal diameter less than the external diameter of said pipe sections prior to insertion of said pipe ends thereinto until said flanges meet in abutting relationship forming an interference fit between said pipe sections and said coupling sleeve.

7. The method set forth in claim 6 including the step of deforming at least a portion of said coupling sleeve inwardly sufficiently to form a corresponding groove in said pipe section, thereby mechanically interlocking said pipe sections and said coupling sleeve.

8. The method set forth in claim 6 including the steps of forming an annular recess in the internal surface of said coupling sleeve, positioning a plastic band within said recess in said coupling sleeve, and positioning said flanges of said plastic collars in abutting relationship within said plastic band.

9. The method set forth in claim 6 including the step of applying a bonding agent to the ends of said pipe sections and to the flanges of said plastic collars prior to insertion of said pipe section ends into said coupling sleeve.

10. The method set forth in claim 6 including the step of cleaning and sizing the ends of said pipe sections prior to insertion of the pipe section ends into said coupling sleeve.

11. The coupling joint defined in claim 1 wherein said radially extending flange includes a substantially axially extending portion extending from the outer edge thereof.

12. An interference fit coupling joint interconnecting two sections of plastic lined metal pipe comprising:
   (a) a plastic end face collar positioned within the end of each pipe section, said end face collar comprising a cylindrical body with its outer surface mating with the inner surface of the liner in the end portion of the plastic liner and having a flange radially extending from one end thereof, said flange mating with the end face of said pipe section; and
   (b) a coupling sleeve comprising a cylindrical body having an internal diameter less than the external diameter of said pipe sections prior to assembly of said coupling joint surrounding the open ends of said pipe sections and maintaining the end faces of said end face collars in abutting relationship.

13. The coupling joint defined in claim 12 wherein said coupling sleeve includes a substantially centrally located annular recess in its internal surface with a plastic band positioned within said recess, and the abutting end faces of said end face collars are positioned within said plastic band.

14. The coupling joint defined in claim 12 wherein at least a portion of said coupling sleeve is inwardly depressed to mate with a corresponding depression in the pipe section to mechanically interlock said coupling sleeve and said pipe section.

15. The coupling joint defined in claim 12 wherein the ends of said coupling sleeve are radially compressed to form a corresponding annular groove in each of said pipe sections and thereby mechanically interlock said coupling sleeve and said pipe sections in a fixed relationship.

16. The coupling joint defined in claim 12 wherein said plastic end face collars are bonded to said plastic liners and to each other.

17. Coupling joint defined in claim 13 wherein said plastic end face collars are bonded to said plastic liners, to each other and to said plastic band.

18. An interference fit coupling joint interconnecting first and second lengths of metal pipe, said first pipe having a bell on one end thereof and said second pipe having a pin end telescopically inserted within said bell, the external diameter of said pin end being greater than the internal diameter of said bell prior to assembly of said coupling joint, comprising:
   (a) a plastic liner bonded to the internal surface of said first pipe and terminating in the throat of said bell;
   (b) a plastic liner bonded to the internal surface of said second pipe and terminating substantially in the plane of the end face of said pin end; and
   (c) an end face liner comprising a tubular plastic body, the external diameter thereof substantially comforming to the internal diameter of the liner in the pin end of said second pipe and having a radially extending flange at one end thereof with a substantially axially extending portion extending from the outer edge thereof, positioned within said pin end with the radially extending flange adjacent the end face of said second pipe and said axially extending portion of said flange overlapping said liner in the throat of said bell.

* * * * *